Figure 1:
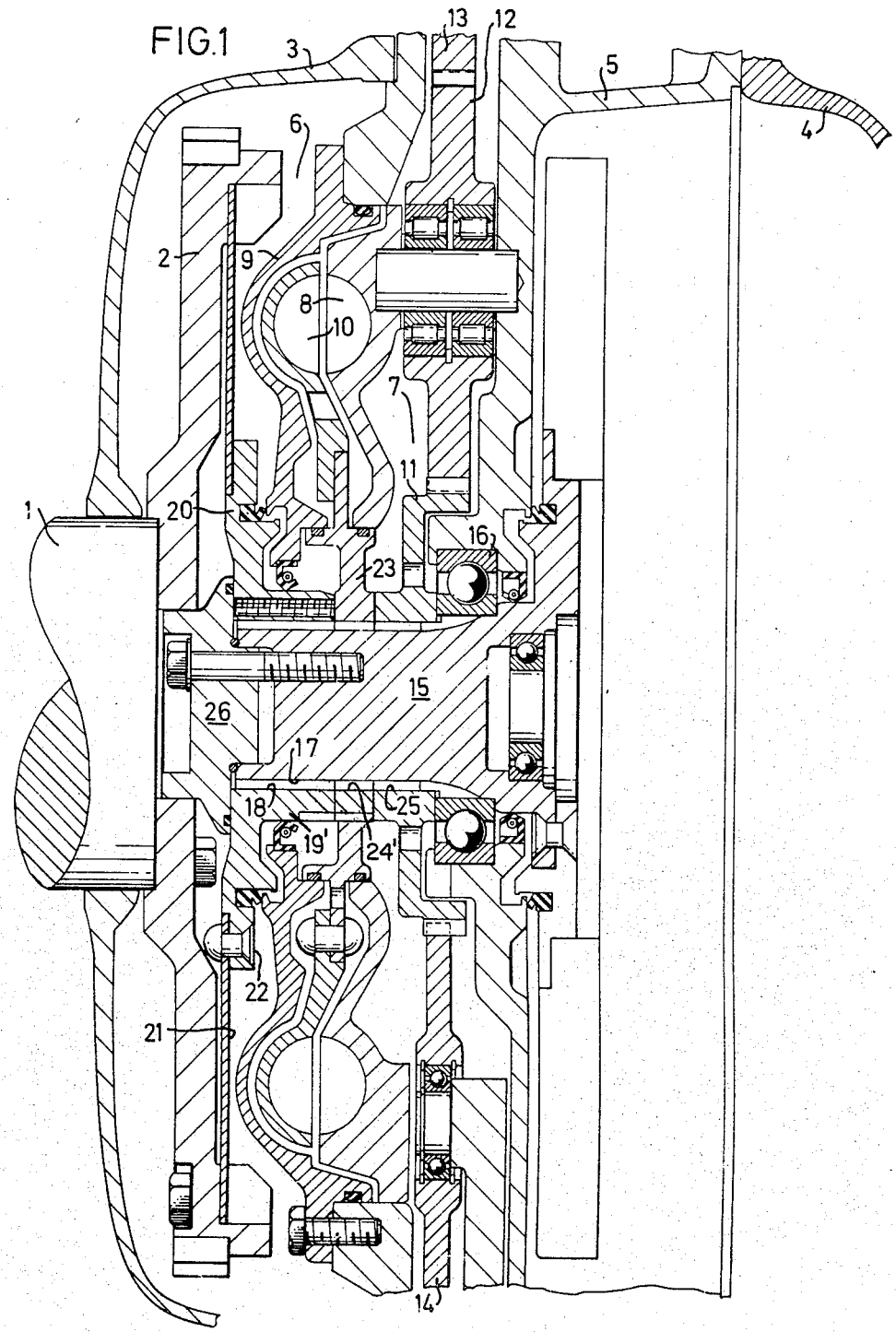

United States Patent [19]

Ternehäll

[11] 4,405,038

[45] Sep. 20, 1983

[54] DEVICE FOR TROQUE TRANSMISSION BETWEEN A DRIVE SHAFT, E.G. AN ENGINE CRANKSHAFT, AND AN ATTACHMENT UNIT SUCH AS A HYDRODYNAMIC RETARDER

[75] Inventor: Runo R. O. Ternehäll, Skärhamn, Sweden

[73] Assignee: Ab Volvo, Gothenburg, Sweden

[21] Appl. No.: 208,009

[22] Filed: Nov. 18, 1980

[30] Foreign Application Priority Data

Nov. 19, 1979 [SE] Sweden ............................. 7909554

[51] Int. Cl.³ ............................................. B60K 41/26
[52] U.S. Cl. .................................... 192/4 B; 74/15.84
[58] Field of Search ............... 192/4 B, 4 A, 12, 3 R; 74/15.63, 15.84; 188/321, 296, 290

[56] References Cited

U.S. PATENT DOCUMENTS

| 3,259,218 | 7/1966 | Black et al. .......................... 192/4 B |
| 3,352,385 | 11/1967 | Johnson ............................. 188/296 |
| 3,490,567 | 1/1970 | Clark et al. .......................... 192/3 R |

FOREIGN PATENT DOCUMENTS 1655928  4/1971  Fed. Rep. of Germany .
7415736  8/1978  Sweden .

Primary Examiner—George H. Krizmanich
Attorney, Agent, or Firm—Young & Thompson

[57] ABSTRACT

A device in motor vehicles for torque transmission between an engine crankshaft and at least one attachment unit in the form of a hydrodynamic retarder and/or a clutch-independent power take-off, wherein the torque transmission is accomplished with the aid of a bearing-mounted extension shaft via a splines connection.

5 Claims, 2 Drawing Figures

DEVICE FOR TROQUE TRANSMISSION BETWEEN A DRIVE SHAFT, E.G. AN ENGINE CRANKSHAFT, AND AN ATTACHMENT UNIT SUCH AS A HYDRODYNAMIC RETARDER

The present invention relates to a device in motor vehicles for torque transmission between an engine crankshaft and at least one attachment unit in the form of a hydrodynamic retarder and/or a clutch-independent power take-off.

U.S. Pat. No. 3,490,567, for example, reviews connecting the rotor of a hydrodynamic retarder directly to the crankshaft of the engine, the crankshaft being provided with an extension made in one piece with the same, which carries the rotor hub. A flange made in one piece with the crankshaft and a pair of spacing collars on the extension fix the axial position of the rotor. The rotor hub, the spacing collars, a gear and the engine flywheel are non-rotatably joined to the crankshaft with the aid of long bolts screwed into the crankshaft flange.

This known construction has several disadvantages. Firstly, the hydrodynamic retarder cannot be made as an attachment unit, since it requires an engine with a specially constructed crankshaft, and secondly, the sealing diameters are large because of the bolt fastening which produces considerable friction. Furthermore, the seal is affected by any wobbling or axial displacement of the crankshaft.

The purpose of the present invention is to achieve a device for torque transmission between, for example, an engine crankshaft and attachment units such as a hydrodynamic retarder or a power take-off; said device eliminating the above-mentioned disadvantages by not requiring a special construction of the engine and transmission, and making possible a short construction length adapted to the module length of other attachment units.

This is achieved according to the invention by a shaft extension arrangement mounted for rotation around an axis of rotation coinciding with the axis of rotation of the crankshaft and comprising a rotatably mounted extension shaft having external splines and a tubular connection member provided with internal splines engaging the external splines of the extension shaft and being non-rotatably joined to the crankshaft, said attachment unit having means which are arranged concentrically either with said extension shaft or with the tubular member, and have internal splines engaging external splines either on said extension shaft or on said tubular member.

Using a bearing-mounted extension arrangement according to the invention, in which the torque transmission takes place via a splines connection, does not require a specially constructed crankshaft, and the sealing diameters can be reduced in comparison with the known bolt-fastening construction. Furthermore, wobbling and axial movements are avoided and the length of the construction can be kept relatively short.

Figure 2:
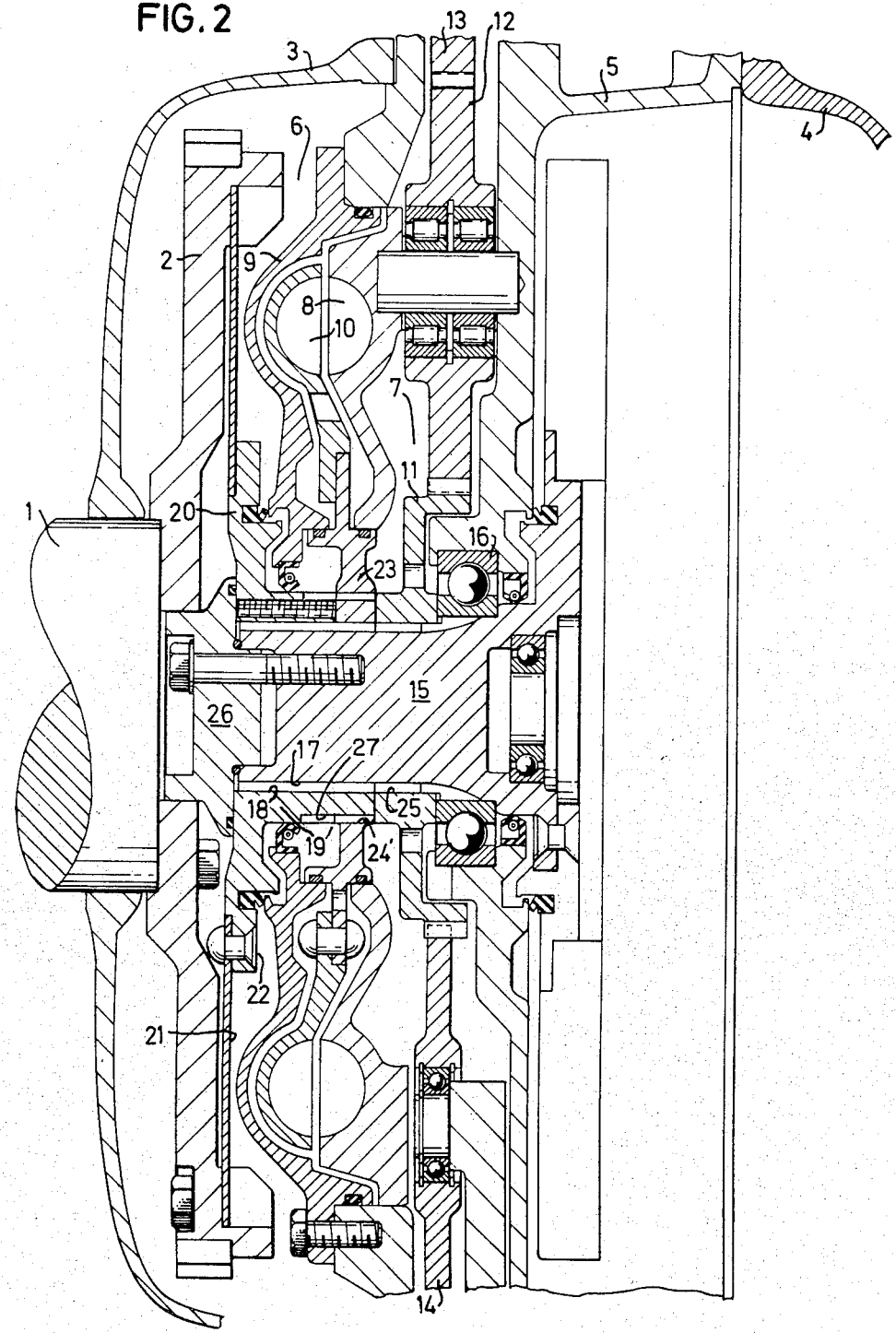

The invention will be described in more detail with reference to an embodiment shown in the accompanying drawings in which FIG. 1 shows a longitudinal section through a hydrodynamic retarder and a power take-off comprising the torque-transmitting device according to the invention, and FIG. 2 shows a modified torque-transmitting device.

In FIG. 1, 1 designates the end of an engine crankshaft which carries in a conventional manner a flywheel 2. Between the flywheel housing 3 and the clutch housing 4 there is a separate housing 5 containing a hydrodynamic retarder 6 and a clutch-independent power take-off 7. The retarder 6 comprises a stator 8 and a rotor 10 enclosed in a housing 9. The power take-off 7 comprises a pinion 11, an intermediate gear 12 and a gear 13 on the output shaft (not shown) of the power take-off. The pinion 11 also drives the fluid pump (not shown) of the retarder 6 via an intermediate gear 14.

A short shaft 15 is carried in a bearing 16 in the housing 5. The shaft 15 is provided with splines 17 which engage internal splines 18 of a tubular coupling sleeve 19. The coupling sleeve 19 has a radial flange 20 to which an annular plate 21 is attached by means of rivets 22. The outer edge of the plate 21 is screwed onto the flywheel 2, thus establishing a rotationally fixed connection between the crankshaft 1 and the shaft 15.

The rotor 10 of the retarder 6 has a hub 23 with internal splines 24 which engage the splines 17 of the shaft 15. In a corresponding manner the pinion 11 has internal splines 25 engaging the splines 17 of the shaft. The coupling sleeve 19, the hub 23 and the pinion 11 are held on the shaft 15 by an end piece 26 screwed onto the end of the shaft and which extends into a central opening in the flywheel 2.

The arrangement described here provides in a simple and effective manner torque transmission to an attachment unit. No major modifications of the engine and gearbox are required. It is sufficient to screw the annular plate 21 onto the flywheel 2 to establish the torque-transmitting connection to the attachment unit. As can be seen from the figure, the sealing diameters are small. The splines connection in combination with the plate 21 compensates for minor angular deviations and axial movement.

As an alternative to the embodiment shown in FIG. 1, the coupling sleeve 19' can be extended up to the pinion 11 and be provided with external splines 27 for engagement with internal splines 24' on a rotor hub carried by the sleeve 19' instead of the shaft 15, as shown in FIG. 2.

What I claim is:

1. A device in motor vehicles for torque transmission between an engine crankshaft and at least one driven unit, said device comprising an extension shaft journalled in bearing means for rotation about an axis of rotation coinciding with the axis of rotation of the crankshaft and having external splines and a tubular connection member having internal splines engaging the external splines of the extension shaft and connected to a fly wheel on the crankshaft by means of an axially flexible member rigidly attached to the fly wheel and to the tubular connection member, the extension shaft end facing the crankshaft and the crankshaft having interengaging means preventing radial but permitting axial movement of the extension shaft in relation to the crankshaft, said driven unit having means which are arranged concentrically with at least one of said extension shaft and said tubular member and have internal splines engaging external splines on one of said extension shafts and said tubular member.

2. A device as claimed in claim 1, characterized in that the external splines of the extension shaft engage internal splines on the rotor hub of a hydrodynamic retarder, as well as internal splines on the hub of a pinion for driving a clutch-independent output shaft.

3. A device as claimed in claim 1, characterized in that the tubular connection member also has external splines, that internal splines on the rotor hub of a hydrodynamic retarder engage the external splines of the connection member, and that internal splines on the hub of a pinion, driving a clutch-independent output shaft, engage the external splines of the extension shaft.

4. A device as claimed in claim 1, characterized in that the extension shaft is mounted in a bearing in the vicinity of its end directed away from the crankshaft.

5. A device as claimed in claim 4, characterized in that the tubular connection member has a radially directed flange which is joined to the flywheel by means of an annular plate which comprises said axially flexible member.

* * * * *